(12) United States Patent
Grounds et al.

(10) Patent No.: US 8,878,686 B2
(45) Date of Patent: Nov. 4, 2014

(54) MAINTAINER SPOTLIGHTING

(71) Applicant: Raytheon Company, Watham, MA (US)

(72) Inventors: Christopher B. Grounds, Huntsville, AL (US); Dennis Min, Columbia, MD (US)

(73) Assignee: Raytheon Company, Waltham, MA (US)

( * ) Notice: Subject to any disclaimer, the term of this patent is extended or adjusted under 35 U.S.C. 154(b) by 127 days.

(21) Appl. No.: 13/662,938

(22) Filed: Oct. 29, 2012

(65) Prior Publication Data

US 2014/0118154 A1  May 1, 2014

(51) Int. Cl.
*G08B 21/00* (2006.01)

(52) U.S. Cl.
USPC .............. 340/686.1; 340/539.13; 340/825.49; 705/6; 705/7.13

(58) Field of Classification Search
USPC ................. 340/539.1, 539.13, 686.1, 825.49, 340/825.69; 705/5, 6, 8, 10, 11, 301, 7.13, 705/7.23
See application file for complete search history.

(56) References Cited

U.S. PATENT DOCUMENTS

| 5,111,391 | A | 5/1992 | Fields et al. | |
|---|---|---|---|---|
| 6,044,355 | A | 3/2000 | Crockett et al. | |
| 7,725,339 | B1 | 5/2010 | Aykin | |
| 2002/0087680 | A1 | 7/2002 | Cerami et al. | |
| 2008/0059271 | A1* | 3/2008 | Thomann et al. | 705/8 |
| 2011/0029349 | A1* | 2/2011 | Omiya | 705/9 |
| 2012/0072252 | A1* | 3/2012 | Deegan et al. | 705/7.11 |
| 2012/0226618 | A1* | 9/2012 | Kay | 705/301 |

* cited by examiner

*Primary Examiner* — Hung T. Nguyen
(74) *Attorney, Agent, or Firm* — Cantor Colburn LLP

(57) ABSTRACT

A system and method for responding to an event is disclosed. A skill level requirement for a worker to respond to the event is determined using a processor. The processor selects a worker to respond to the event based on a skill level and a location of the worker with respect to the event. The processor sends a notification to the selected worker to respond to the event.

20 Claims, 5 Drawing Sheets

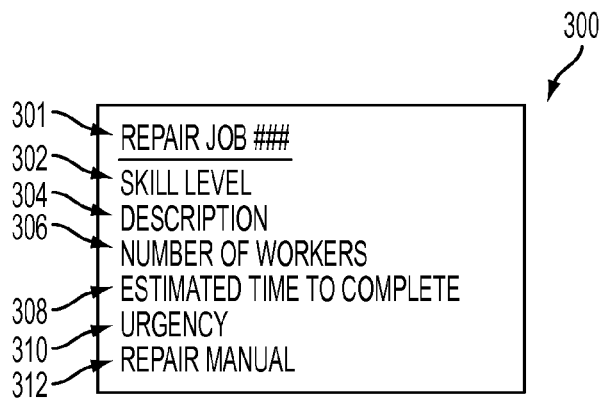
FIG. 3
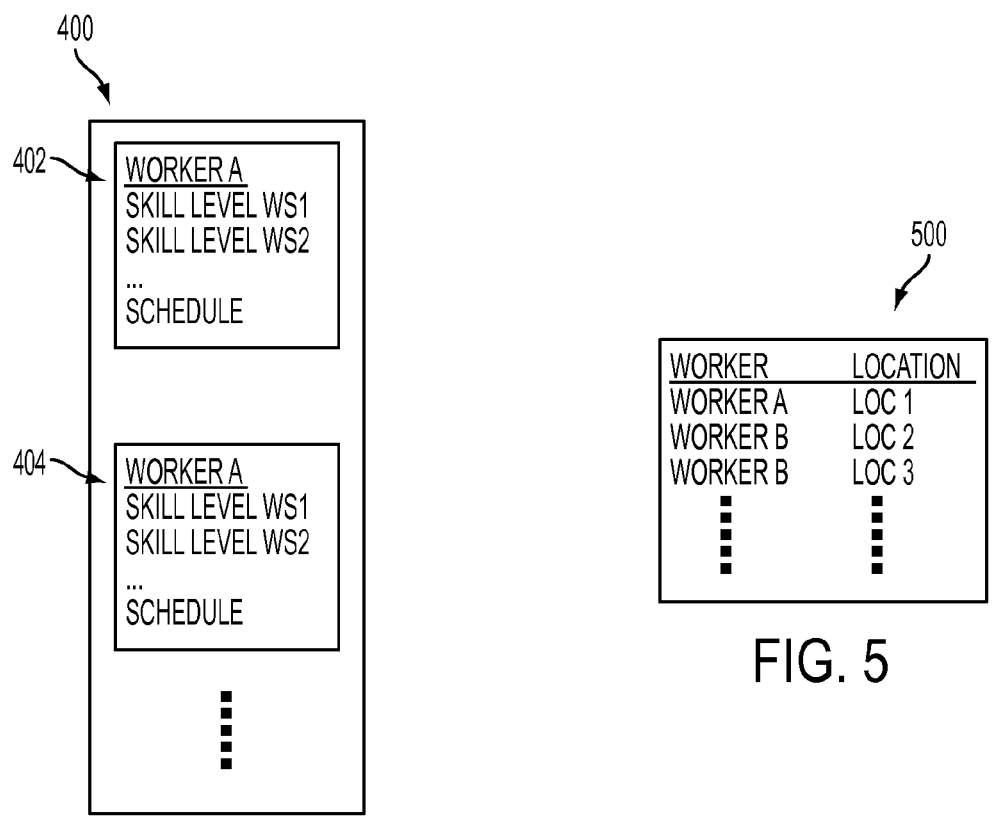
FIG. 4
FIG. 5

MAINTAINER SPOTLIGHTING

BACKGROUND

The present disclosure relates to a system and method for repair and maintenance and, more specifically, to assembling suitable repair personnel in response to a non-scheduled repair job within an organization.

In large organizations, such as industries, military organizations, large businesses, etc., various unscheduled reparations and maintenance tasks need to be performed. These tasks generally require a quick or immediate response in order to maintain operations. In addition, different repair jobs may require the attention of a worker or workers having a certain skill level. In such large organizations, a boss or superior may have so many workers that he or she may be unable to keep track of each worker's skill levels, their current locations, their schedules and other criteria. Thus, when an urgent repair job arises, he or she may not be able to assemble a suitable work crew to address the repair job in a sufficient time-frame.

SUMMARY

According to one embodiment of the present disclosure, a method of responding to an event includes: determining a skill level requirement for a worker to respond to the event; using a processor to select a worker to respond to the event based on a skill level and a location of the worker with respect to the event; and notifying the selected worker to respond to the event.

According to another embodiment of the present disclosure, a computer program product includes a computer readable storage medium having computer readable program code embodied therewith, the computer readable program code comprising instructions, that when executed by a computer, implement a method of responding to an event, wherein the method includes: determining a skill level value requirement for responding to the event; selecting a worker to respond to the event based on a skill level of the worker and a location of the worker with respect to the event; and sending a notification to the selected worker to respond to the event.

According to another embodiment of the present disclosure, a system for responding to an event includes a processor configured to: determine a skill level requirement for responding to the event; select a worker to respond to the event based on a skill level of the worker and a location of the worker with respect to the event; and notify the selected worker to respond to the event.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

FIG. 3 shows an exemplary repair job entry that may be stored in a job database;

FIG. 4 shows an exemplary worker database having worker entries stored therein;

FIG. 5 shows an exemplary database of workers locations;

DETAILED DESCRIPTION

Figure 1:
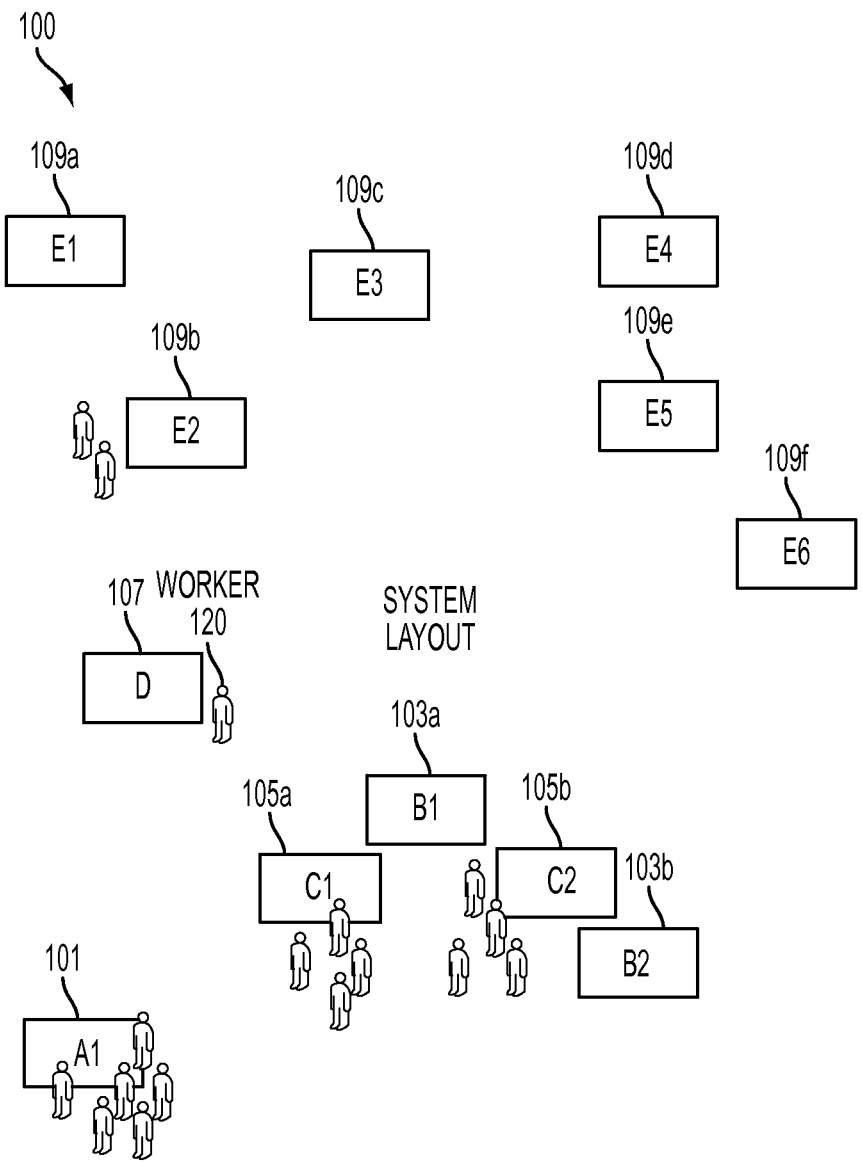
FIG. 1 shows an illustrative layout of an exemplary workplace of an organization.

FIG. 1 shows an illustrative layout 100 of an exemplary workplace of an organization. The exemplary workplace may be a business organization, non-profit organization, military organization or other type of organization. The exemplary workplace may include various work stations at which a particular aspect of the organization is performed. The exemplary work stations of layout 100 include Station A (101) Station B1 (103a) and Station B2 (103b); Station C1 (105a) and Station C2 (105b); Station D (107) and Stations E1-E6 (109a-109f). At each work station, a worker may be responsible for performing duties with respect to different aspects of the organization. Activities and functions at Station A (101) may be entirely different that activities and functions at Stations C1 and C2 (105a and 105b), for example. Thus, the skills required at one workstation may be entirely different that the skills required at another workstation.

In an exemplary embodiment, each workstation may include various pieces of equipment, machinery, etc. that may occasionally break down and require repair or maintenance. In various aspects, this equipment and/or machinery may break down at random or unscheduled times. Depending on the equipment, repair of the equipment may require a worker to have at least a selected level of skill and/or knowledge. For example, repairing a flat tire may require a low level of skill, while repairing electronic equipment may require a high level of skill. Repair jobs may be assigned a skill level indicating a level of skill required by a worker in order to perform the repair jobs. Workers are generally tested and given a grade or skill level indicting his or her qualifications for repairing a selected piece of equipment. In an exemplary embodiment, these skill levels may be indicated by a selected number, such as Level 1, Level 2, etc., and are usually selected by the organization.

Workers, such as exemplary worker 120, are shown at the various work stations of layout 100. In various operations of the organization, workers are mobile within the layout 100 in order to be able to attend to matters at the one or more workstations. The workers may be equipped with a location tracking device such as a global position system (GPS) tracking device that determines the worker's location within the system layout 100. The exemplary tracking devices may send location tracking data to a central database or processor at selected intervals. The worker 120 may also be equipped with a communication device for receiving instructions from the system disclosed herein, which instruct the worker to report to a given location to perform a repair job. The exemplary communication device may include a phone, a smartphone, a pager, etc.

Figure 2:
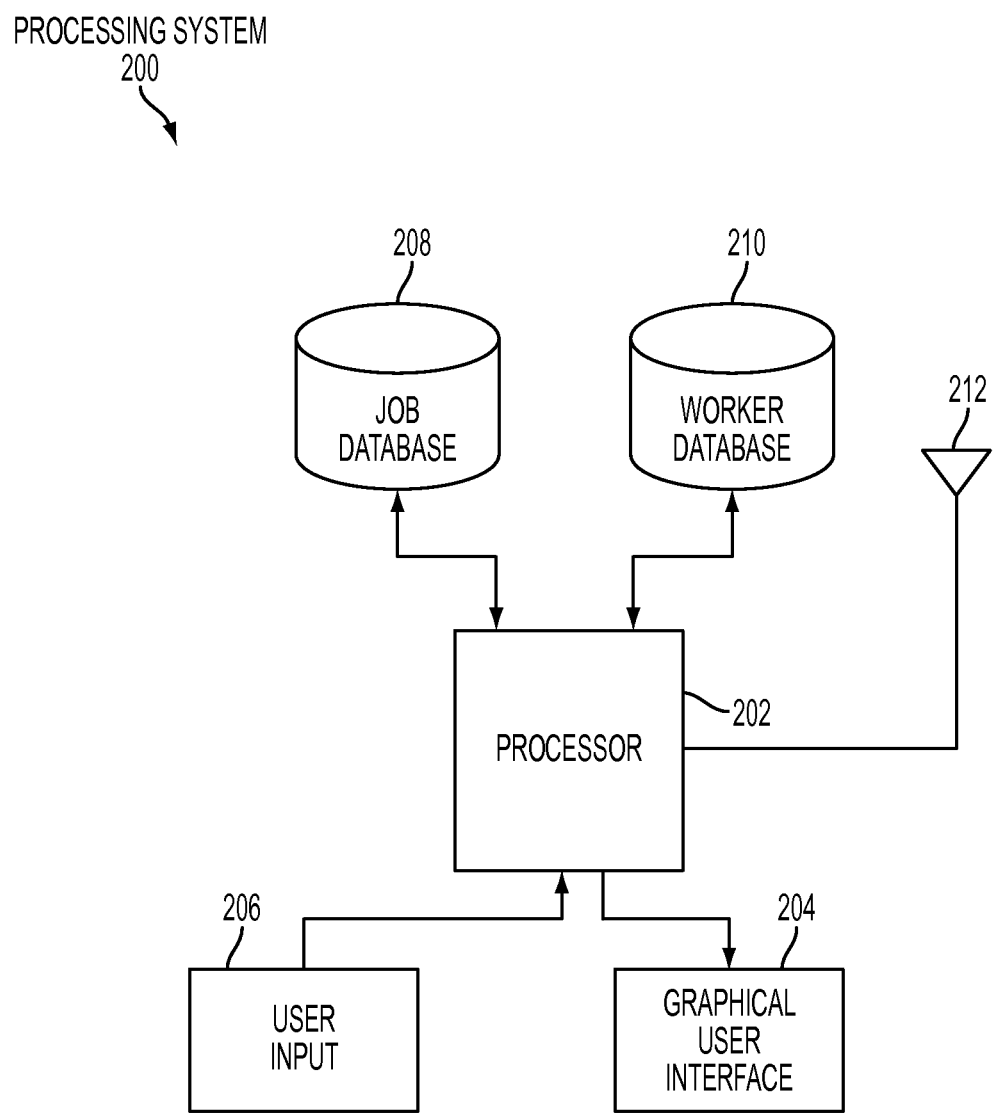
FIG. 2 shows an exemplary processing system for scheduling a response to an event within the organization.

FIG. 2 shows an exemplary processing system 200 for scheduling a response to an event such as a repair job or maintenance job. The exemplary system 200 includes a processor 202 that performs the exemplary methods disclosed herein to select workers to repair machinery. The processor 202 is coupled to a graphical user interface 204 that may receive and display data from the processor 202. The processor 202 may also be coupled to an input 206 that provides data to the processor 202. In various embodiments, the input device 206 may include a keyboard or mouse or may include a touchscreen that is coupled to the graphical interface 204. The processor 202 may further be coupled to various databases which may include a repair job database 208 and a worker database 210. The repair job database 208 may include a database of repair jobs and specifications that may be required to perform them. The worker database 210 may include data for workers in the organization, their repair job skill levels, and their schedules, among other data. The processor 202 may be further coupled to an antenna 212 or database that includes the locations of the various workers of the organization. At selected intervals, the location data may be updated by the location tracking devices carried by the workers. Alternatively, the processor 202 may query the tracking devices at a given time over selected intervals.

FIG. 3 shows an exemplary repair job entry 300 that may be stored in a job database 208. The repair job entry 300 may include a repair job identification number 301 and a description 304 of the repair job. Each repair job entry 300 may further include a skill level 302 required for completion of the repair job, a number of workers 306 required to complete the repair job and an estimated time 308 to complete the repair job. Other parameters may also be stored with relation to a repair job, such as for example, an urgency 310 of the repair job or, in other words, an importance of the repair to operation of the organization. Additionally, the repair job database may include or provide access to one or more repair manuals 312 which may be stored electronically.

FIG. 4 shows an exemplary worker database 400 having worker entries 402, 404 that may be stored therein. In one embodiment, the worker database 210 may include an entry for a plurality of workers of the organization. An exemplary worker entry 402 may include a skill level 410 of the worker as well as the worker's schedule 412. In one embodiment, a worker may have a number of skill levels, each pertaining to different workstations. For example, a worker may have a high level of skill for working on repairs that occur at station A (101) but have a low level of skills for working on repairs at station C1 and C2 (105a and 105b). Therefore, the exemplary worker entry 402 may include a number of fields for describing the worker's skill levels.

FIG. 5 shows an exemplary location database 500 that includes worker locations. The exemplary database may be updated at selected intervals or upon request by a user of the system described herein. In one embodiment, the location database 500 may be accessed by the antenna 212 of the exemplary system 200. Alternatively, the processor 202 may use antenna 212 to retrieve location data directly from location tracking devices carried by the workers.

Figure 6:
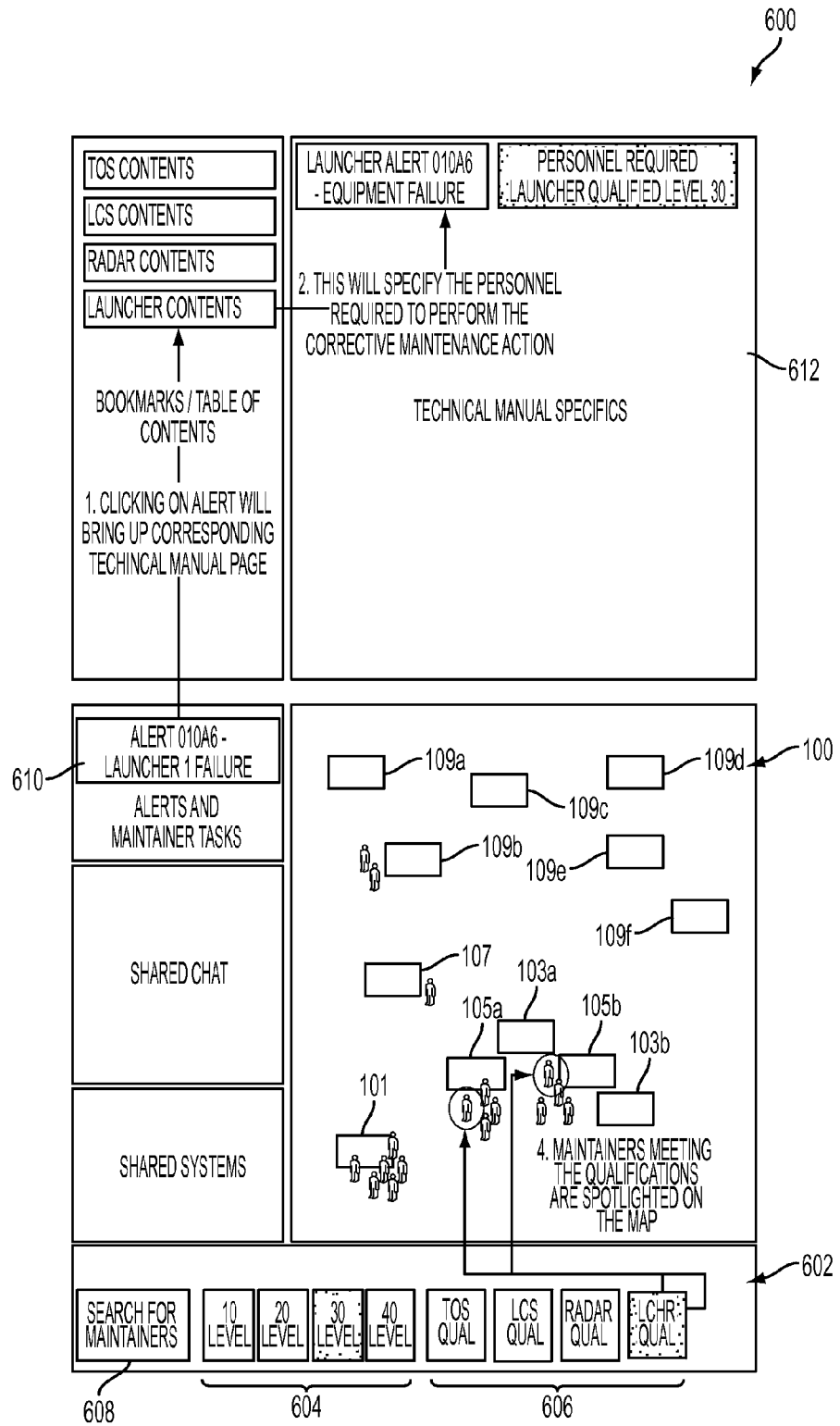
FIG. 6 shows an exemplary interface enabling a user to use the system described herein for selecting a work crew in response to a failed piece of equipment or a maintenance need.

FIG. 6 shows an exemplary interface enabling a user to use the system 200 described herein for selecting a work crew in response to a failed piece of equipment or a maintenance need. The display 600 includes a panel that shows a representation of the exemplary layout 100 of FIG. 1. In various embodiments, the user may be able to perform zoom in and zoom out functions on the exemplary layout 100. The exemplary layout 100 shows the various locations of the workstations of FIG. 1. Various representative icons are shown to indicate workers and their locations with respect to the workstations. The location of the worker is determined by the location tracking data provided to the processor. The representative layout 100 may be updated to show the movement of the workers. The display 600 also includes a selection bar 602, shown for illustrative purposes along the bottom of the display 600, although the selection bar 602 may be placed at any selected location of the display 600. The selection bar 602 may include a number of selectable icons or buttons at which the user may select criteria for assembling a suitable repair crew for a repair job. Exemplary skill levels 604 (e.g., 10 Level, 20 Level, 30 Level, 40 Level) that may be selected by the user are indicated. The selection bar 602 may further include a number of selectable icons 606 for selecting workstations, such as Station A, Station B, Station C, Station D, for example. Selecting the workstation may indicate a location of the broken equipment to the processor 202, which may use the equipment location to select nearby workers. The display user may select the workstation. Upon selecting a workstation 606 and a qualification level 604, the user may select a button 608 to start the processor 202 to perform a search of exemplary databases 208 and 210 based on the selected repair job criteria and worker location data. Upon performing the search, the processor 202 may send data to the display 600. The display 600 may indicate the selected worker(s) by changing a visual aspect of the icon(s) that represent the selected worker(s). In the exemplary display 600, representations 620 and 622 or workers have been circled to indicate their being selected to perform the selected repair. Other methods for indicating selected workers may also be used, such as by highlighting the worker representation, changing a color of a worker representation, etc. Additionally, the criteria may be changed by the system user and another search performed of the workforce.

In one aspect of the exemplary embodiment, the display 600 may provide an icon or button 610 enabling the user to retrieve a technical manual 612 for the specific repair job and display the retrieved technical manual 612 at the display 600. The technical manual 612 may also be displayed at a suitable graphical interface that may be used by the selected workers, including a graphical interface at the workstation having the equipment failure.

Figure 7:
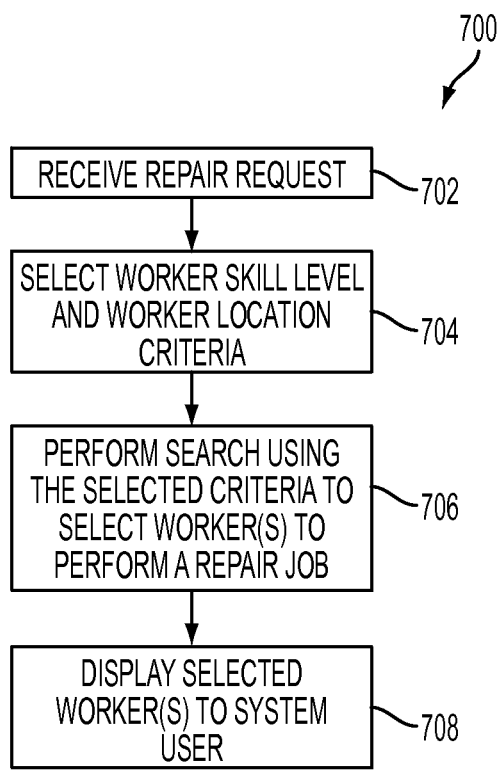
FIG. 7 shows a flowchart illustrating an exemplary method of selecting a worker to respond to an event such as a repair job according to the methods disclosed herein.

FIG. 7 shows a flowchart illustrating an exemplary method of selecting a worker to respond to an event such as a repair job. In box 702, a repair job is recognized or a repair ticket is received. This repair ticket may be entered into the system by a system user. In box 704, the system user may select a qualification level for the repair ticket. The user may also specify a distance of the people from the repair job as criteria, such as within 50 feet, within a quarter of a mile, etc. Alternatively, the system user may indicate the workstation at which the repair is needed. In box 706, the processor 202 may perform a filter on the workforce in the worker database using the criteria selected in box 704 in order to select workers who have the required skill level and who are within a selected distance of the repair job, or otherwise meet a selected distance criterion. The processor 202 may also check workers' schedules to determine which worker is available for a given repair. The processor may use urgency of repair to schedule a repair when a suitable selected worker is available. In box 708, the processor 202 sends data to the graphical user interface 204 wherein a representation of the worker or workers may be highlighted using the exemplary methods described herein. Additionally, the processor 202 may send a notice to the selected workers, for example, by sending a message to a communication device carried by the selected workers, such as a cellular device, for example.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the exemplary embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method of responding to an event, comprising:
   determining, using a processor, a skill level requirement for a worker to respond to the event;
   selecting the worker to respond to the event based on a skill level and a location of the worker with respect to the event; and
   notifying the selected worker to respond to the event.

2. The method of claim 1, further comprising tracking a location of a workforce from which the worker is selected.

3. The method of claim 1, further comprising comparing the skill level of the worker to the skill level requirement for responding to the event.

4. The method of claim 1, further comprising using the processor to select the worker using a criterion that is at least one of: a time constraint for responding to the event; a time duration for responding to the event; an urgency for responding to the event; a time constraint of the worker; a current workload of the worker; and a location of the worker with respect to the event.

5. The method of claim 1, further comprising providing instructions for responding to the event at the interface.

6. The method of claim 1, further comprising displaying a representation of the selected worker at a graphical interface wherein a visual impression of the representation of the selected worker differentiates the representation of the selected worker from a representation of an unselected worker displayed at the graphical interface.

7. The method of claim 1, wherein the event is a randomly-occurring event.

8. The method of claim 1, wherein the event is least one of: a failure of a piece of equipment, and maintenance of a piece of equipment.

9. A computer program product comprising:
   a computer readable storage medium having computer readable program code embodied therewith, the computer readable program code comprising instructions, that when executed by a computer, implement a method of responding to an event, wherein the method comprises:
      determining a skill level value requirement for responding to the event;
      selecting a worker to respond to the event based on a skill level of the worker and a location of the worker with respect to the event; and
      sending a notification to the selected worker to respond to the event.

10. The computer program product of claim 9, wherein the method further comprises comparing the skill level of the worker to the skill level requirement for responding to the event to select the worker.

11. The computer program product of claim 9, wherein the method further comprises selecting the worker using a criterion selected from at least one of: a time constraint for responding to the event; a time duration for responding to the event; an urgency for responding to the event; a time constraint of the worker; a current workload of the worker; and a location of the worker with respect to the event.

12. The computer program product of claim 9, wherein the method further comprises displaying instructions for responding to the event to the selected worker at a graphical interface.

13. The computer program product of claim 9, wherein the method further comprises displaying a representation of the selected worker at a graphical interface wherein a visual impression of the representation of the selected worker differentiates the representation of the selected worker from a representation of an unselected worker displayed at the graphical interface.

14. A system for responding to an event, comprising:
    a processor configured to:
       determine a skill level requirement for responding to the event;
       select a worker to respond to the event based on a skill level of the worker and a location of the worker with respect to the event; and
       notify the selected worker to respond to the event.

15. The system of claim 14, wherein the processor is further configured to compare the skill level of the worker to the skill level requirement for responding to the event.

16. The system of claim 14, wherein the processor is further configured to select the worker using a criterion selected from the group consisting of: a time constraint for responding to the event; a time duration for responding to the event; an urgency for responding to the event; a time constraint of the worker; a current workload of the worker; and a location of the worker with respect to the event.

17. The system of claim 14, further comprising a graphical interface configured to display a set of selection criteria for selecting the worker at a graphical interface and wherein the processor is further configured to select the worker according to selected criteria.

18. The system of claim 17, wherein the set of selection criteria includes at least one of the skill level requirement and a workstation location.

19. The system of claim 14, wherein the processor is further configured to display a representation of the selected worker at a graphical interface wherein a visual impression of the representation of the selected worker at the graphical interface differentiates the representation of the selected worker from a representation of an unselected worker displayed at the graphical interface.

20. The system of claim 14, further comprising displaying instructions for responding to the event to the selected worker.

* * * * *